(12) United States Patent
Williams et al.

(10) Patent No.: US 7,070,299 B2
(45) Date of Patent: Jul. 4, 2006

(54) LIGHTING APPARATUS

(76) Inventors: John David Williams, RMB 2927 Nelson Bay Road, Salt Ash NSW 2318 (AU); Ian James Maitland, 496 East Seaham Road, East Seaham NSW 2324 (AU); Darryl John Jones, 147 Rookes Road, Salt Ash NSW 2318 (AU)

( * ) Notice: Subject to any disclaimer, the term of this patent is extended or adjusted under 35 U.S.C. 154(b) by 0 days.

(21) Appl. No.: 10/229,389

(22) Filed: Aug. 26, 2002

(65) Prior Publication Data
US 2003/0133291 A1    Jul. 17, 2003

(30) Foreign Application Priority Data
Aug. 24, 2001  (AU) .................................... PR7253

(51) Int. Cl.
*F21V 9/00* (2006.01)
(52) U.S. Cl. ..................... 362/231; 362/259; 362/276; 362/470
(58) Field of Classification Search ............... 362/231, 362/276, 800, 240, 259, 470
See application file for complete search history.

(56) References Cited

U.S. PATENT DOCUMENTS

| | | | | |
|---|---|---|---|---|
| 3,968,358 A | * | 7/1976 | Baader | 362/478 |
| 5,013,972 A | * | 5/1991 | Malkieli et al. | 315/209 R |
| 5,032,961 A | * | 7/1991 | Pouyanne et al. | 362/251 |
| 5,585,783 A | * | 12/1996 | Hall | 340/473 |
| 5,782,552 A | | 7/1998 | Green et al. | |
| 5,925,572 A | * | 7/1999 | Byrne et al. | 436/163 |
| 6,013,985 A | | 1/2000 | Green et al. | |
| 6,031,343 A | * | 2/2000 | Recknagel et al. | 315/292 |
| 6,131,321 A | * | 10/2000 | Daigle, Jr. | 40/612 |
| 6,280,082 B1 | * | 8/2001 | Aoyama et al. | 374/121 |
| 6,355,989 B1 | | 3/2002 | Westcott | |
| 6,357,893 B1 | * | 3/2002 | Belliveau | 362/285 |
| 6,361,192 B1 | * | 3/2002 | Fussell et al. | 362/331 |
| 6,402,338 B1 | * | 6/2002 | Mitzel et al. | 362/154 |
| 6,573,659 B1 | | 6/2003 | Toma et al. | |
| 6,621,177 B1 | | 9/2003 | Westcott | |

FOREIGN PATENT DOCUMENTS

| | | |
|---|---|---|
| CA | 2241044 | 4/2002 |
| WO | WO 97/05422 | 2/1997 |

* cited by examiner

*Primary Examiner*—Stephen Husar
*Assistant Examiner*—Mark Tsidulko
(74) *Attorney, Agent, or Firm*—Fish & Neave IP Group Ropes & Gray LLP

(57) ABSTRACT

There is disclosed lighting apparatus suitable for being positioned adjacent to an area or an object for indicating the location or orientation of the area or object. The apparatus is provided with a set of light emitters for emitting light and which are positioned side by side relative to one another. The light emitters are staggered for emitting the light outwardly from the apparatus at an increasing angle along the set relative to a plane of reference. In a particularly preferred embodiment, the light emitters are light emitting diodes. The apparatus finds particular application as an airstrip light for indicating the position and orientation of the airstrip to approaching aircraft. Signalling apparatus for being positioned adjacent to an area for indicating the position of the area and which are provided with infrared emitting diodes for emitting an infrared signal are also described.

57 Claims, 8 Drawing Sheets

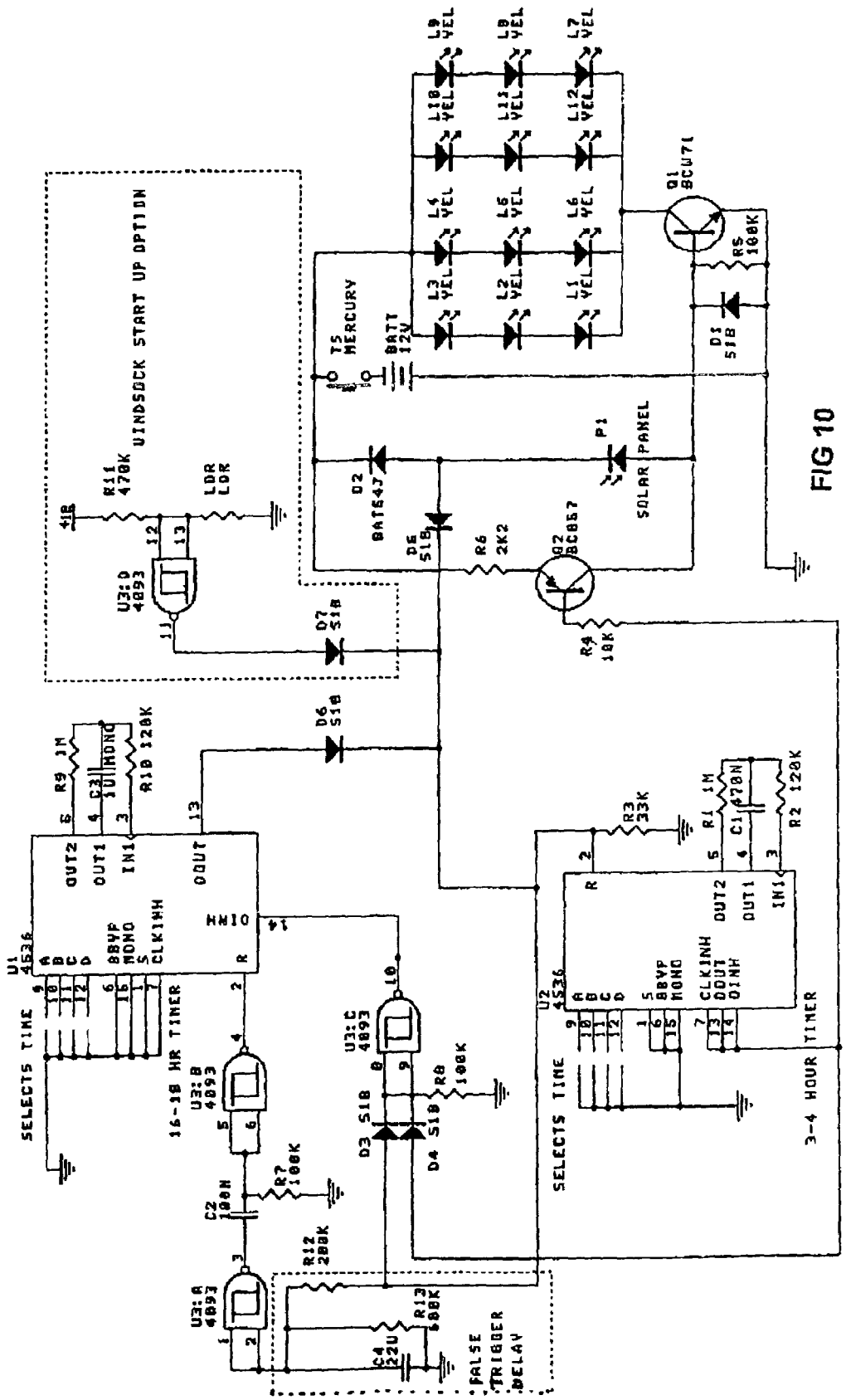

LIGHTING APPARATUS

This application claims priority to Australian application PR 7253 filed Aug. 24, 2001. The entire contents of the above-referenced patent application are incorporated herein by reference.

FIELD OF THE INVENTION

The present invention relates to lighting apparatus suitable for indicating the location of an area or for projecting light onto an object or surface to indicate orientation of the object or distance to the illuminated surface. The invention further relates to a timer system for controlling operation of the lighting apparatus. The invention finds use in both domestic and commercial applications.

BACKGROUND OF THE INVENTION

Many private and rural airstrips in Australia and other countries around the world lack safe and suitable landing lights for illuminating the runway for the landing of approaching aircraft and the departure of aircraft already on the ground. In many instances, a flight originally intended to reach its destination in daylight hours is delayed by bad weather, wind, later than anticipated departure times or other reasons resulting in the flight arriving at the intended airstrip at or past sunset. Indeed, in emergency situations it may be necessary for an aircraft carrying medical personal and equipment to land at an airstrip past sunset.

In such situations, it is usual procedure for the pilot to contact persons at the destination to illuminate the airstrip for the landing of the flight when it is known the arrival of the flight will be past sunset.

The airstrip may be illuminated with the use of kerosene wick lanterns, torches or for instance vehicle or tractor headlights. However, this is far from satisfactory. A system of battery powered lanterns may also be utilised to illuminate an airstrip for the arrival of late or emergency flights. However, this system too suffers from disadvantages. In particular, the batteries of such lanterns need to be adequately charged and the lanterns need to be well maintained. In the case of kerosene lamps, it can be difficult to light the wick in wet or poor weather, and the lamps can present a serious fire hazard in dry periods. Further, the light from torches or vehicle headlights is generally insufficient for illuminating more than only a limited section of an airstrip.

Further, such lighting systems generally lack reliability and each depend on persons being present at the airstrip for their use. Unavailability of persons at the airstrip can have disastrous consequences particularly in poor weather conditions with the potential for loss of life.

In addition, a hard wired buried cable, lighting and power source system is expensive to install and in many instances, limited use of an airstrip makes installation of such a system uneconomical. These systems also require relatively intensive maintenance for satisfactory working operation.

SUMMARY OF THE INVENTION

It is an aim of the present invention to ameliorate one or more of the problems of the prior art or to at least provide a useful alternative to the prior art.

In one aspect of the present invention there is provided lighting apparatus suitable for being positioned adjacent an area or an object to indicate the location or orientation of the area or object, comprising:

a set of light emitters for emitting light and being positioned side by side relative to one another;

wherein the light emitters are staggered for emitting the light outwardly from the lighting apparatus at an increasing angle along the set relative to a plane of reference.

The lighting apparatus may further comprise a housing on which the light emitters are mounted.

Accordingly, in another aspect of the present invention there is provided lighting apparatus suitable for indicating the location or orientation of an area or object, comprising:

a housing; and a set of light emitters for emitting light, and being mounted on the housing and positioned side by side relative to one another;

wherein the light emitters are staggered for emitting the light outwardly from the lighting apparatus at an increasing angle along the set relative to a plane of reference.

Preferably, each successive light emitter of the set is arranged for emitting the light at an increased angle with respect to the plane of reference compared to an immediately preceding light emitter of the set, respectively.

Preferably, consecutive ones of the light emitters are orientated at an angle relative to one another for thereby emitting the light at the increasing angle relative to the plane of reference, and the angle between the consecutive ones of the light emitters is substantially constant along the set.

Preferably, the light emitters will be spaced apart along a concave surface on one side of the housing. The light emitters are staggered around the concave of the surface such that the light emitters are thereby orientated for emitting the light at the increasing angle along the set relative to the plane of reference. In a particularly preferred embodiment, a further correspondingly arranged set of light emitters are provided on at least one other side of the housing and most preferably, along a concave surface on the other side of the housing.

Preferably, the lighting apparatus will be adapted for use as an airstrip light for being positioned alongside an airstrip for indicating the location and direction of the airstrip. In this instance, at least some of the light emitters in the, or each, set will be arranged for emitting the light upwardly to facilitate viewing of the light from an elevated position. Preferably, all of the light emitters in the, or each, set will be arranged for emitting the light upwardly.

The light emitters within a set will generally all emit light of the same colour. The light emitted by a further set of light emitters may also be the same colour. However, embodiments may be provided wherein the light emitters of one set emit a light of a different colour to the other set(s) of light emitters. This is desirable when the lighting apparatus is positioned alongside an airstrip to indicate the position and direction of the airstrip. Specifically, light emitters of one colour may be used to indicate one direction along the airstrip and light emitters on an opposite side of the housing to indicate the opposite direction along the airstrip.

Typically, a plurality of lighting units of the present invention will be spaced apart along each side of the airstrip to indicate the position and direction of the airstrip.

Preferably, one or more light emitters of a set will be arranged for emitting light that overlaps with the light from an, or each, adjacent light emitter of the set. Most preferably, the light from each light emitter will overlap with the light emitted from each adjacent light emitter thereby providing a band of light.

Preferably, the increase in angle between consecutive ones of the light emitters at which the light is emitted will usually be in a range of from about 3° to about 10° relative to the plane of reference, and preferably about 6°. The difference in angle between the first and last of the light emitters of a set at which the light is emitted will usually be in a range of from about 15° to about 60° and most preferably, in a range of from about 20° to about 40°.

Preferably, each light emitter will be adapted for emitting the light in a beam primarily over an angle from about 4° to about 15°, more preferably over an angle of from about 6° to about 10° and most preferably, over an angle of about 8°.

By arranging the light emitters within a set of light emitters to emit the light at an increasing angle along the set relative to the plane of reference, the light may be viewed by an approaching aircraft within a large angle range such that the light remains readily visible throughout the descent of the aircraft for landing at the airstrip. Preferably, at least some of the light will remain visible to the aircraft in a range of up to about 65° relative to the horizontal and more preferably, in a range of from about 2° to about 50°.

The lighting apparatus may operate on a continuous or discontinuous basis. By "continuous basis" is meant the light emitters within a set operate for a single period during a given time period over an operation cycle of the lighting apparatus such as from sunset to sunrise or for instance, from prior to sunset until after sunrise. By "discontinuous basis" is meant the light emitters are operated for a plurality of predetermined periods during the operation cycle of the lighting apparatus. The light emitters may flash on and off continuously during the, or each, period of operation.

Preferably, the lighting apparatus will be adapted for automatic operation of the light emitters for one or more periods during the operation cycle of the apparatus.

Preferably, the lighting apparatus will be adapted for being operated on a discontinuous basis during the operation cycle and most preferably, on at least two occasions for a set period each time, respectively.

Preferably, the lighting apparatus will incorporate a control system for controlling operation of the light emitters, comprising a light sensitive element for detecting ambient light, and a timer system for determining the length of operation of the light emitters during the or each desired period during the operation cycle.

Accordingly, in another aspect of the present invention there is provided lighting apparatus for indicating the location or orientation of an area or object, wherein the apparatus is adapted for detecting a decrease in ambient light below a threshold level and providing light on at least a first occasion for an initial period and a second occasion for a subsequent period during an operation cycle of the lighting apparatus, and timing a predetermined period of time for being interrupted by the provision of the light for the initial period, and wherein the operation cycle is such that an interval between the first occasion and the second occasion is determined by remaining time of the predetermined period of time following expiry of the initial period.

Preferably, the control system of the lighting apparatus will comprise a timer for timing the predetermined period, and at least one further timer for determining the length of the initial period and the subsequent period. Most preferably, the control system will comprise:

a light sensitive element for detecting the ambient light;
a first timer for timing the predetermined period; and
a second timer for determining the length of the initial period and the subsequent period;
wherein the first timer is arranged for commencing the timing of the predetermined period upon the light sensitive element detecting an increase in the ambient light to a desired level, and for interrupting the timing of the predetermined period upon the light sensitive element detecting the ambient light decreasing below the threshold level for thereby allowing the light to be provided by the light emitters for the initial period determined by the second timer, prior to the timing of the predetermined period by the first timer continuing at the expiry of the initial period.

Preferably, the desired level of ambient light required for causing the commencement of the timing of the predetermined period of time will be lower than the threshold level of ambient light below which the timing of the predetermined period of time is interrupted.

The length of the initial period and the length of the subsequent period during which the light is provided may be the same or different. Preferably, the periods will be substantially the same length of time as each other. Generally, the initial period and the subsequent period will range from several minutes up to about 5 hours or more and preferably, from between about 2 hours up to about 4 hours.

Desirably, the lighting apparatus will be adapted for emitting light prior to sunset until after sunset. Alternatively, a lighting apparatus of the invention may only emit light for a period commencing prior to sunset and expiring during the night. In those embodiments which operate on a discontinuous basis, the light emitters will preferably be switched off following sunset and subsequently be switched on again before sunrise and then remain on until daylight has reached a suitable level or until the completion of the operation cycle.

Preferably, the control system of the lighting apparatus will be adapted for resetting the operation cycle upon the ambient light increasing to the desired level typically, at or after sunrise.

Preferably, the lighting apparatus will further comprise a power source for supplying power for the generation of the light by the light emitters. Preferably, the power source will comprise one or more batteries. Most preferably, the one or more batteries will be rechargeable.

Preferably, the lighting apparatus will further incorporate a solar panel comprising an array of photovoltaic cells for generating electricity for recharging the or each of the batteries. In particularly preferred embodiments, the solar panel will be utilised as the light sensitive element in the control system for the purpose of detecting the level of ambient sunlight.

By being adapted to operate on a discontinuous basis, the lighting apparatus may be provided in a more compact form than required for continuous operations, by allowing the use of a smaller solar panel and batteries with a reduced storage capacity.

Lighting apparatus of the invention may also be adapted for causing the light emitters to be emitted during a period outside the normal period or periods of operation of the light emitters. Preferably, the lighting apparatus will incorporate an activation system for causing the light to be emitted when desired. The activation system may for instance comprise a manual switch for switching the light on. In another form, the activation system will be responsive to an external activation signal.

Most preferably, the lighting apparatus will be adapted for causing light to be emitted by the light emitters upon ambient light such as from a torch or vehicle headlights being shone onto the apparatus during periods of low available sunlight or darkness.

Alternatively, the activation signal may comprise a signal transmitted from a remote transmitter. The transmitter may be a hand held transmitter module, or for example, a transmitter carried by an aircraft or a land vehicle. The signal may comprise for example, a HF, UHF, VHF or other radio frequency (RF) signal, or a signal of a different frequency such as an audio frequency. Where a radio frequency is used it will generally be a VHF signal as this is the frequency range typically employed by aircraft radios. Accordingly, the activation system of an embodiment of the invention may comprise a receiver for receiving the signal for effecting the generation of the light by the lighting apparatus.

Preferably, the light when emitted outside the normal period of operation of the light emitters will be provided for a period of from several minutes up to 5 hours or more and most preferably, for a period of from about 10 minutes to about 50 minutes.

Surprisingly, the inventors have found that by staggering the set of light emitters side by side relative to one another, and arranging the light emitters for emitting light at an increasing angle along the set relative to a plane of reference, light emitted by the light emitters may be projected onto an object distant from the lighting apparatus such that the light lies at an angle relative to the set of light emitters.

This striking observation has significant practical applications and may for instance, be used to indicate the orientation of an object such as a wind sock or weather vane. That is, light may be projected from the lighting apparatus onto the wind sock or weather vane therealong to facilitate viewing of the wind sock or weather vane and thereby, allow ready determination of the direction of the wind in darkness. This is particularly advantageous for aircraft approaching an airstrip or in other situations where wind socks or weather vanes are utilised such as for indicating the direction of wind to motorists or for monitoring pollution emission in industrial applications.

The lighting apparatus may therefore be adapted for being mounted onto a bracket at an elevated position in which case the light emitters are arranged for emitting the light downwardly onto the wind sock.

Accordingly, in another aspect of the present invention there is provided lighting apparatus for projecting light onto an object to indicate orientation of the object comprising:

a plurality of light emitters for emitting light and being positioned side by side relative to one another;

wherein the light emitters are staggered for emitting the light outwardly from the lighting apparatus at an increasing angle along the set relative to a plane of reference.

As distance from the lighting apparatus is required to obtain the complete rotation of the emitted light relative to the light emitters, the apparatus may also be used for indicating the distance to a remote surface. Specifically, by knowing the distance from the apparatus at which complete rotation of the light relative to the positions of the light emitters is achieved, the lighting apparatus can be used to evaluate the distance to a remote surface. That is, if the light shone from the light emitters onto the remote surface is at less than complete rotation relative to the position of the light emitters, the distance from the lighting apparatus to the surface is less than the known required distance.

Hence, in a yet further aspect of the present invention there is provided lighting apparatus for projecting light onto a remote surface for indicating distance to the surface, comprising:

a plurality of light emitters for emitting light and being positioned side by side relative to one another;

wherein the light emitters are staggered for emitting the light outwardly away from the lighting apparatus at an increasing angle along the set relative to a plane of reference.

If the light shone on the remote surface lies at less than full rotation relative to the position of the light emitters, the angle the light has been rotated relative to the position of the light emitters may be measured to obtain an estimate of the distance from the lighting apparatus to the surface.

The light emitters of the lighting apparatus embodied by the invention may utilise light emitting diodes, laser lights or for instance, halogen lights for providing the light. Preferably, the light emitters will be light emitting diodes and most preferably, super bright light emitting diodes.

Accordingly, in another aspect of the present invention there is provided lighting apparatus suitable for indicating the location or orientation of an area or object, comprising one or more light emitting diodes for emitting light for indicating the position of the area.

In yet another aspect of the present invention there is provided lighting apparatus for being positioned adjacent an area or an object to indicate the location or orientation of the area or object, comprising a plurality of light emitting diodes for emitting light for indicating the location or orientation of the area or object.

In a further aspect of the present invention there is provided lighting apparatus for projecting light onto a remote surface for indicating distance from the apparatus to the surface, comprising:

a plurality of light emitting diodes for emitting light onto the remote surface and being positioned side by side relative to one another;

wherein the light emitting diodes are staggered for emitting the light outwardly from the lighting apparatus at an increasing angle along the set relative to a plane of reference.

In still another aspect of the present invention there is provided an airstrip light for being positioned alongside an airstrip for indicating the position of the airstrip to approaching airborne aircraft, comprising one or more light emitting diodes for emitting light for thereby indicating the position of the airstrip.

Embodiments of the invention may also be provided for various other purposes besides use as airstrip lights. In particular, embodiments may be utilised as beacons, emergency and obstacle lights for indicating the site of an accident or position of obstacles, taxiway or pathway lights and for instance, direction lights. Typically, lighting apparatus embodied by the invention will be sealed from the environment and substantially waterproof.

A signalling apparatus provided with one or more infrared emitting diodes is also described herein.

Hence, in still another aspect of the present invention there is provided signalling apparatus for being positioned adjacent an area to indicate the location of the area, comprising:

a set of infrared emitting diodes for emitting an infrared signal and being positioned side by side relative to one another;

wherein the infrared emitters are staggered for emitting the infrared signal outwardly from the signalling apparatus at an increasing angle along the set relative to a plane of reference.

In a yet further aspect of the present invention there is provided signalling apparatus for being positioned adjacent an area to indicate the location of the area, comprising:

a set of infrared emitting diodes for emitting an infrared signal; and an activation system for enabling activation of operation of the infrared emitting diodes remotely from the signalling apparatus for a predetermined period of time.

The light emitters of an embodiment of the invention may be arranged side by side relative to each other in a pattern extending any desired direction and may for instance be arranged in a substantially horizontally directed or vertically directed pattern. Preferably, the light emitters will be arranged in a substantially horizontal pattern.

The features and advantages of the present invention will become further apparent from the following detailed description of preferred embodiments of the present invention.

BRIEF DESCRIPTION OF THE ACCOMPANYING DRAWINGS

FIG. 10 is a circuit diagram of still another embodiment of the present invention.

DETAILED DESCRIPTION OF PREFERRED EMBODIMENTS OF THE INVENTION

Figure 1:
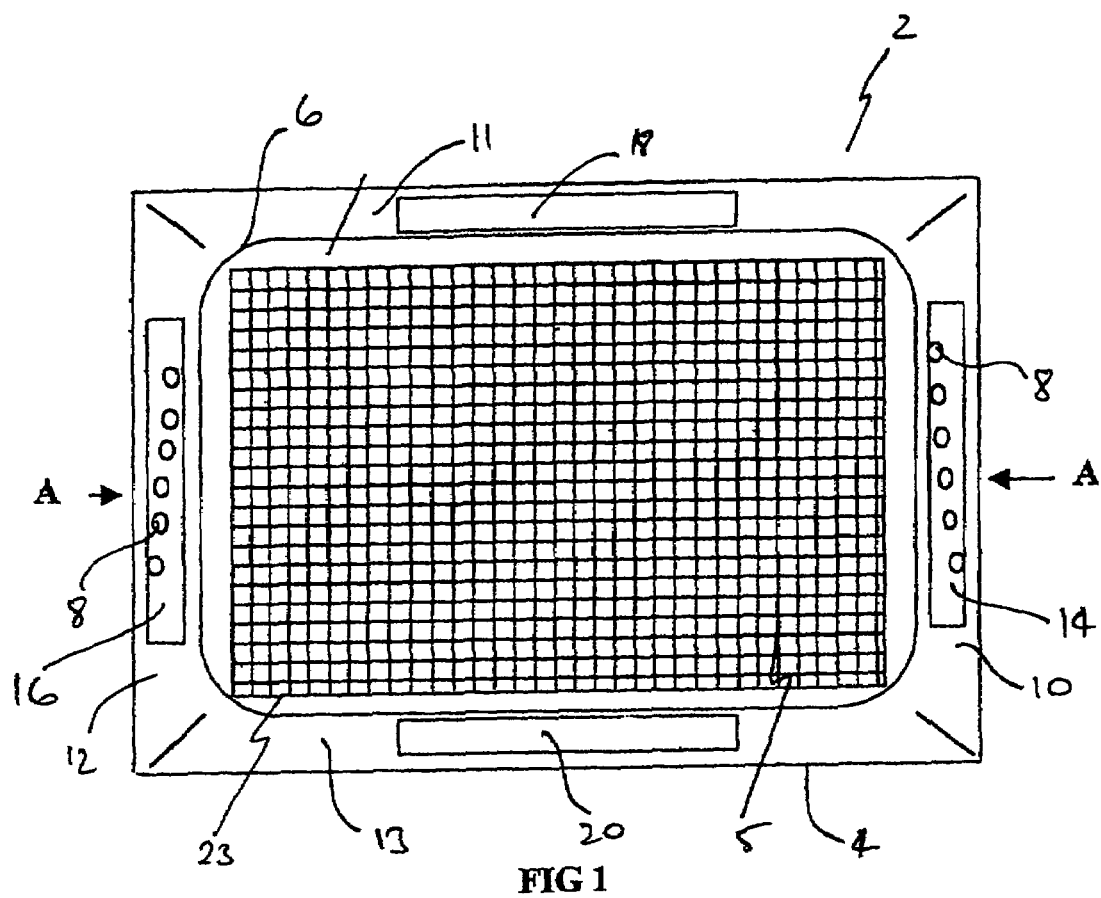
FIG. 1 is a plan view of lighting apparatus embodied by the present invention.

The lighting apparatus shown in FIG. 1 is a sealed airstrip light for indicating the position and orientation of an airstrip and consists of a lighting unit 2 comprising a housing 4 made of polycarbonate. A solar panel comprising an array of photovoltaic cells 5 for generating electricity is mounted in the housing 4 under the top wall 6 of the housing 4.

A set of six super bright light emitting diodes 8 with an output of approximately 7,500 mcd per diode is provided on the forward and rear stepped end faces 10 and 12 of the housing respectively, although it will be understood that diodes with a different output rating may of course be employed. For instance, super bright diodes, with an output rating over 10,000 mcd are now readily commercially available. The diodes in each set are spaced apart from each other along a concave channel 14 and 16 extending across each end face 10 and 12 of the housing. The channel has a curvature of approximately 22°. A reflective strip 18, 20 is provided on each side 22 and 24 of the housing.

Preferably, the light emitting diodes utilised will have an output rating of at least 2,500 mcd, more preferably at lest about 4,500 mcd and typically, about 6,000 mcd or greater. Preferably, the light emitted by the diodes will be viewable from an altitude of at least 1,000 m, more desirably from an altitude of about 2,000 m or greater and preferably from an altitude of at least 3,000 m.

Each LED 8 emits light primarily in an 8° angle of emission about its longitudinal axis. The diodes in each set are arranged to emit light at an increasing angle relative to a horizontal plane of reference 15 from one to the next. The increase in angle between the light emitters at which the light is emitted is substantially constant. In the embodiment shown, the increase in angle from diode to diode is 6°, and the longitudinal axis of the lowest LED of each set is arranged at an angle of 40° relative to the horizontal while the longitudinal axis of the highest LED of each set lies at an angle of 10° with respect to the horizontal. Accordingly, the light emitted from each diode within a set overlaps with the light emitted from each adjacent diode so that effectively, a continuous band of light is emitted over a range from about 2° to about 48° relative to the horizontal.

Each of the diodes is mounted substantially perpendicularly on the concave floor of the channel 14, 16 and hence, the angle at which each diode is orientated relative to the horizontal is determined by the position of the diode around the curvature of the concave floor. The positioning of the LED's 8 in the concave channel 14, 16 provides mechanical protection against damage in the event that an aircraft or vehicle runs over the lighting unit when in position In addition, by virtue of the angled arrangement of the LED's of each set relative to horizontal, the light emitted by at least two of the LED's will be viewable substantially at maximum intensity by the pilot of an approaching aircraft during each stage of descent of the aircraft for landing. The remainder of the LED's will generally still be visible depending on the viewing angle and provide an impression of a much larger light source. The curvature of the concave channels 14 and 16 is more clearly shown in FIG. 2.

Figure 2:
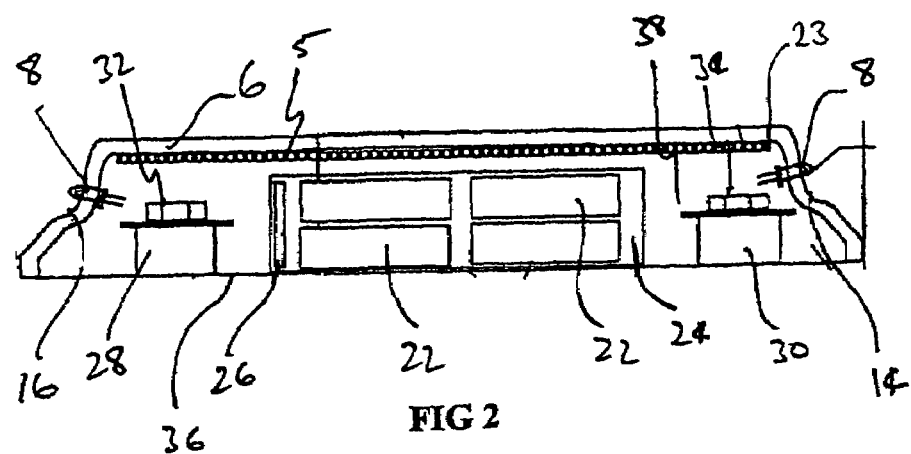
FIG. 2 is a schematic cross-sectional view through A—A of the lighting apparatus of FIG. 1.

As is further shown in FIG. 2, a number of rechargeable batteries 22 are provided within the housing 4 and are recharged by electricity generated by the solar panel 23. The batteries act as a power source for a control system for operation of the lighting unit 2 as will be discussed further below, and are housed in a control box 24 with a printed circuit board 26 of the control system. Preferably, regulation of battery charging is simply achieved by selecting a battery capacity sufficient for anticipated electricity generation talking into account calculated electricity requirements of the airstrip light. Typically, the components of the airstrip light will be selected such that electricity generation will generally match the calculated electricity requirements of the airstrip light over each operation cycle.

A pair of threaded ferules 28 and 30 receiving bolts 32 and 34 are provided on the base 36 of the lighting unit 2. The bolts extend from the lighting unit to allow the lighting unit to be bolted to a suitable bracket or mount in use. The interior void 38 of the lighting unit 2 is filled with an epoxy resin providing strength to the lighting unit Typically, an embodiment of a lighting unit of the invention will be capable of withstanding a static point load in excess of 500 kilograms. Access to the batteries 22 and the printed circuit board 24 may be achieved by removal of a cover plate from the base 36. The airstrip light is sealed against the entry of water into the interior of the housing 4.

Figure 3:
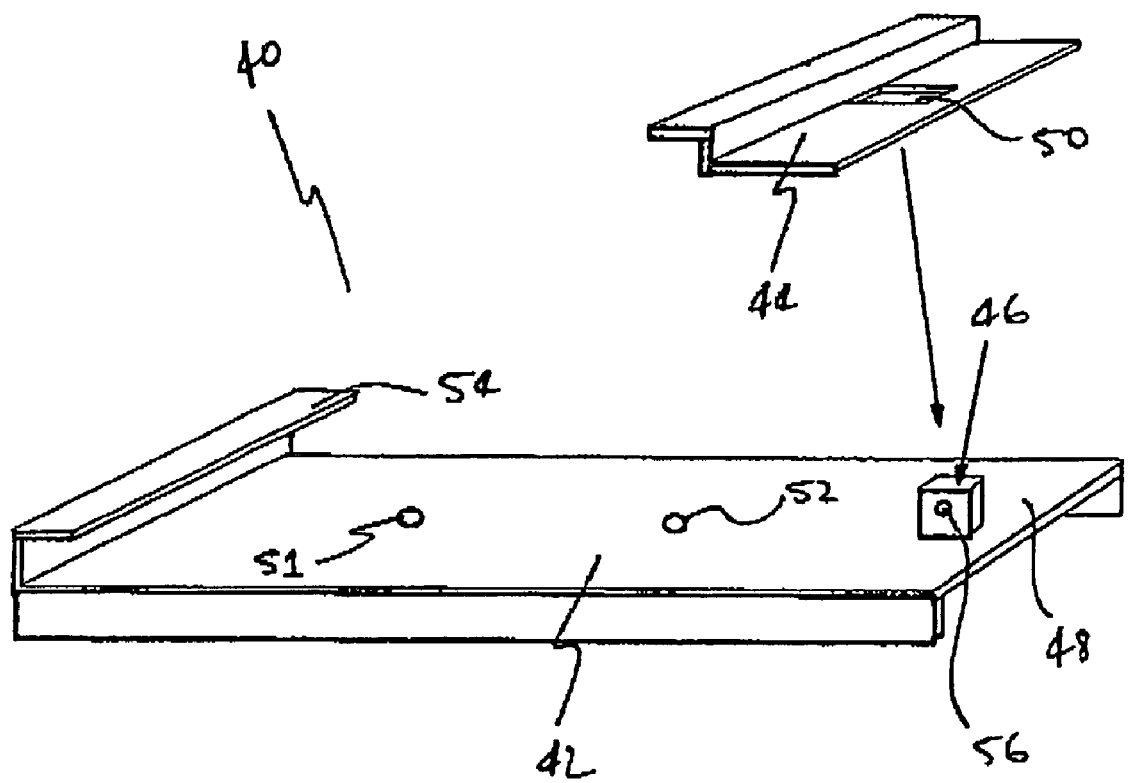
FIG. 3 is an exploded perspective view of a mounting bracket for securing the lighting apparatus of FIG. 1 in position.

Rather than securing the lighting apparatus to a mount or bracket by means of bolts 32 and 34, a separate bracket may be provided for securing the apparatus in position. An exploded view of a suitable locking bracket 40 is shown in FIG. 3. The locking bracket comprises a cadmium plated steel base 42 and end locking strip 44. The base 42 is provided with an upstanding lock mount 46 on one end region 48 for reception by corresponding aperture 50 of the locking strip 44.

In use, the base 42 is secured to a concrete mount by screws inserted through countersunk holes 51 and 52 of the base. The lighting unit 2 is then seated on the base such that a stepped end region of the lighting unit 2 is inserted under flange 54 of the base prior to the locking strip being placed over the opposite end region of the lighting unit such that the lock mount is received in aperture 50 of the locking strip, and the hasp of a padlock being inserted through aperture 56 of the lock mount and the padlock locked to thereby secure the lighting unit in position on the base.

In practice, a plurality of lighting units 2 will be positioned along the entire length of each side of the airstrip such that each set of LED's of each lighting unit face along the airstrip respectively. One set of LED's of each of the lighting units 2 are desirably one colour and the other set of LED's another colour, the lighting units being positioned such that the LED's of the same colour of each unit face one direction and the other set of LED's of each lighting unit face the opposite direction thereby defining approach and departure directions of the airstrip.

In other embodiments, rather than the sets of LED's being arranged on the opposite ends regions of the lighting unit, one of the sets of LED's may be provided on side face 11 or 13 of the housing 4 for indicating the intersection with a cross runway, taxiing strip or pathway. Similarly, embodiments may be provided with sets of LED's arranged at opposite ends of the housing as well as a further set of LED's on the side face 11 or 13 of the housing. The further set of LED's will typically emit light of a different colour. The further LED's may or may not be operated at the same time as the other sets of LED's.

Surprisingly, it has been found that by arranging each successive LED for emitting light at an increased angle to an immediately preceding LED as indicated in FIG. 1, the emitted band of light is rotated about an axis 57 with distance to a substantially upright orientation relative to the LED's. That is, although the set of LED's is arranged substantially horizontally, the emitted band of light is rotated to a substantially upright position as is generally indicated in FIG. 4 and FIG. 5.

Figure 4:
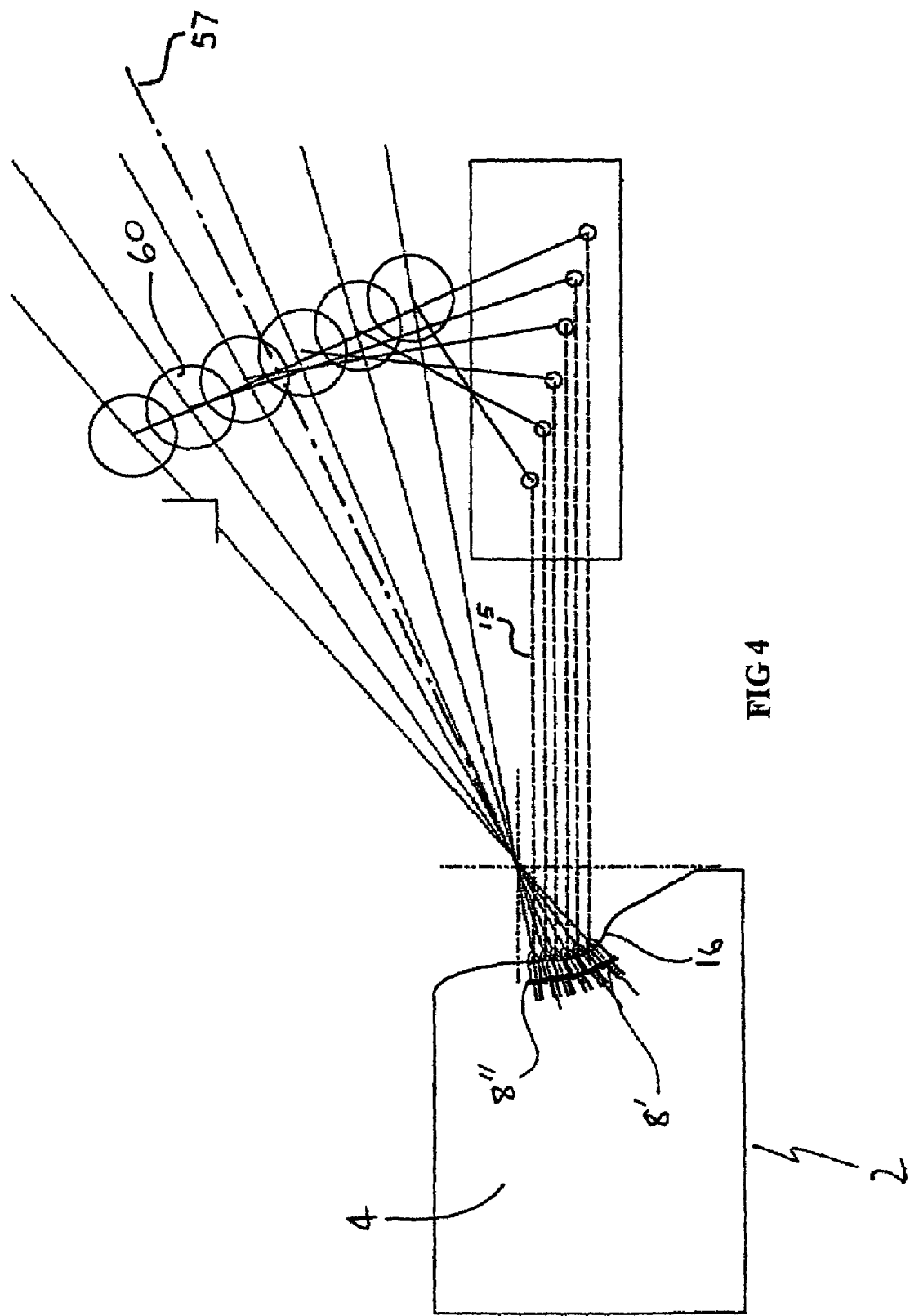
FIG. 4 is a schematic side view illustrating the rotation of light emitted by the lighting apparatus of FIG. 1 relative to the light emitters.
Figure 5:
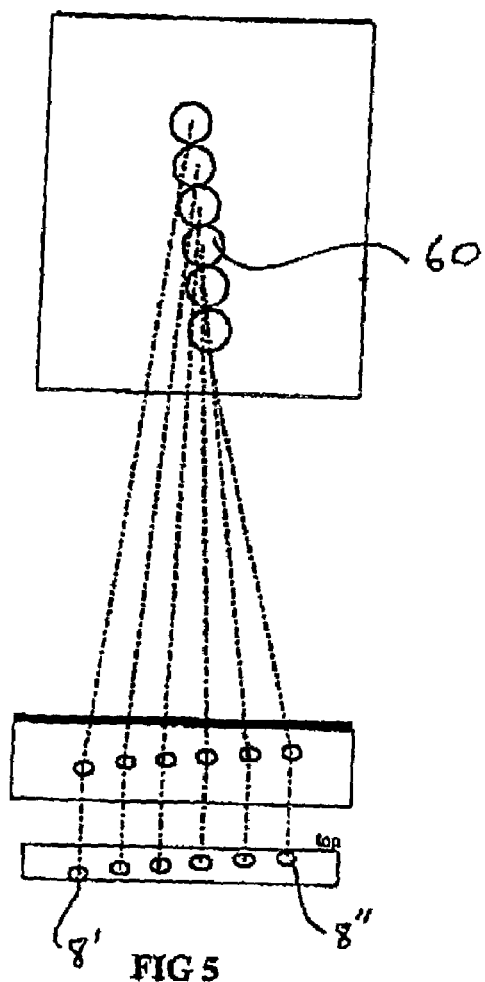
FIG. 5 is a further schematic view illustrating the rotation of the light emitted by the light emitters of the lighting apparatus of FIG. 1.

As can been seen in FIG. 4, the light emitted by the lowest LED 8' illuminates the upper region of the rotated light band 60 while the light emitted by the highest LED 8' illuminates the lower end region of the resultant upright light band 60. The rotation of the light band with distance is more clearly shown in FIG. 5. In particular, that figure shows that at distance A from the LED's (50 mm for the embodiment shown in FIG. 1), the orientation of the band of light substantially mirrors that of the corresponding LED's, but at distance B (500 mm) the band of light has rotated to a substantially upright position relative to the orientation of the set of LED's.

A lighting unit 2 of the present invention may be operated on a continuous basis such that the LED's are switched on prior to sunset and operate until sufficient daylight is available for safe operation of the airstrip or for only a predetermined period following being switched on and generally, only for about 3 to 4 hours. Alternatively, a lighting unit may be operated on a discontinuous basis such that the LED's are switched on prior to sunset for a predetermined period of time before being switched off and subsequently back on prior to sunrise for operation until sufficient daylight is available for safe operation of the landing strip. Typically, the LED's will be switched on for about 3 to 4 hours each time. If desired, a control system of the lighting apparatus for controlling the operation of the LED's may incorporate a flash circuit for causing the LED's to flash on and off continuously while being operated.

Figure 6:
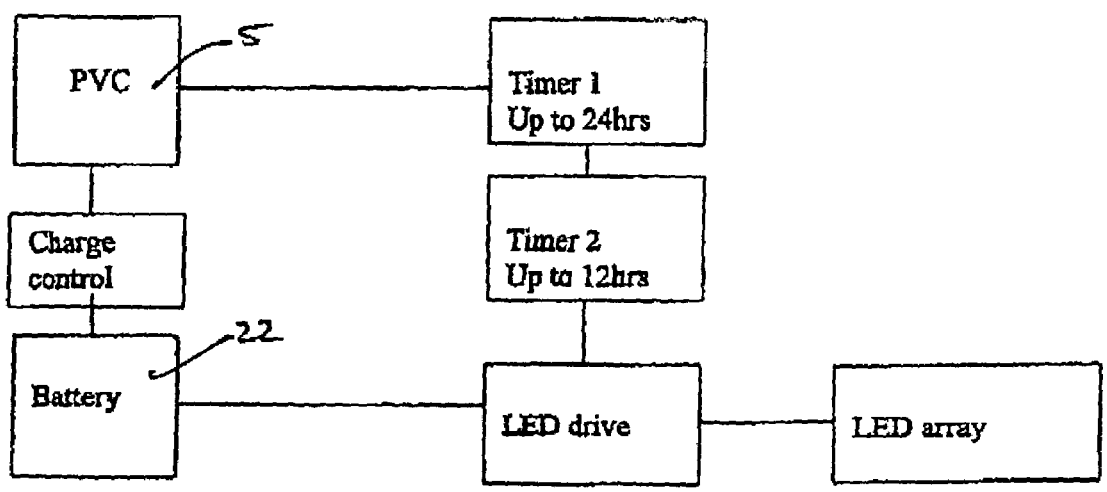
FIG. 6 is a block diagram illustrating the operational system of the lighting apparatus of FIG. 1.

A block diagram for a control system for operating the LED's of lighting unit 2 for two periods of three hours at or about sunset and prior to sunrise respectively, is shown in FIG. 6. The control system incorporates two timers T1 and T2. T1 counts for 18 hours while T2 counts for 3 hours.

At sunrise, sunlight impinges on the solar panel causing the photovoltaic cells to generate a voltage. As the voltage rises both T1 and T2 are reset, and T1 immediately restarts its count. At or about sunset when the daylight decreases and the voltage generated by the photovoltaic cell decreases below a threshold level, T1 is stopped but holds its count, T2 is started and the LED's are energised. At the completion of 3 hours, T2 stops and T1 is restarted and continues its counting. At the end of the complete 18 hour period T1 stops, T2 is restarted and the LED's are energised for another 3 hour period or until the rising sun causes T1 and T2 to be reset.

As will be understood from the above, the sum of the counting periods of T1 and T2 totals 24 hours. Moreover, the start and ran time of T2 is completely reliant on the length of the initial period counted by T1. As a result, regardless of however long the daylight may be available, the operation periods of the LED's will always overlap the critical sunset and sunrise periods. Accordingly, the operation of the lighting apparatus is latitude independent.

Figure 7:
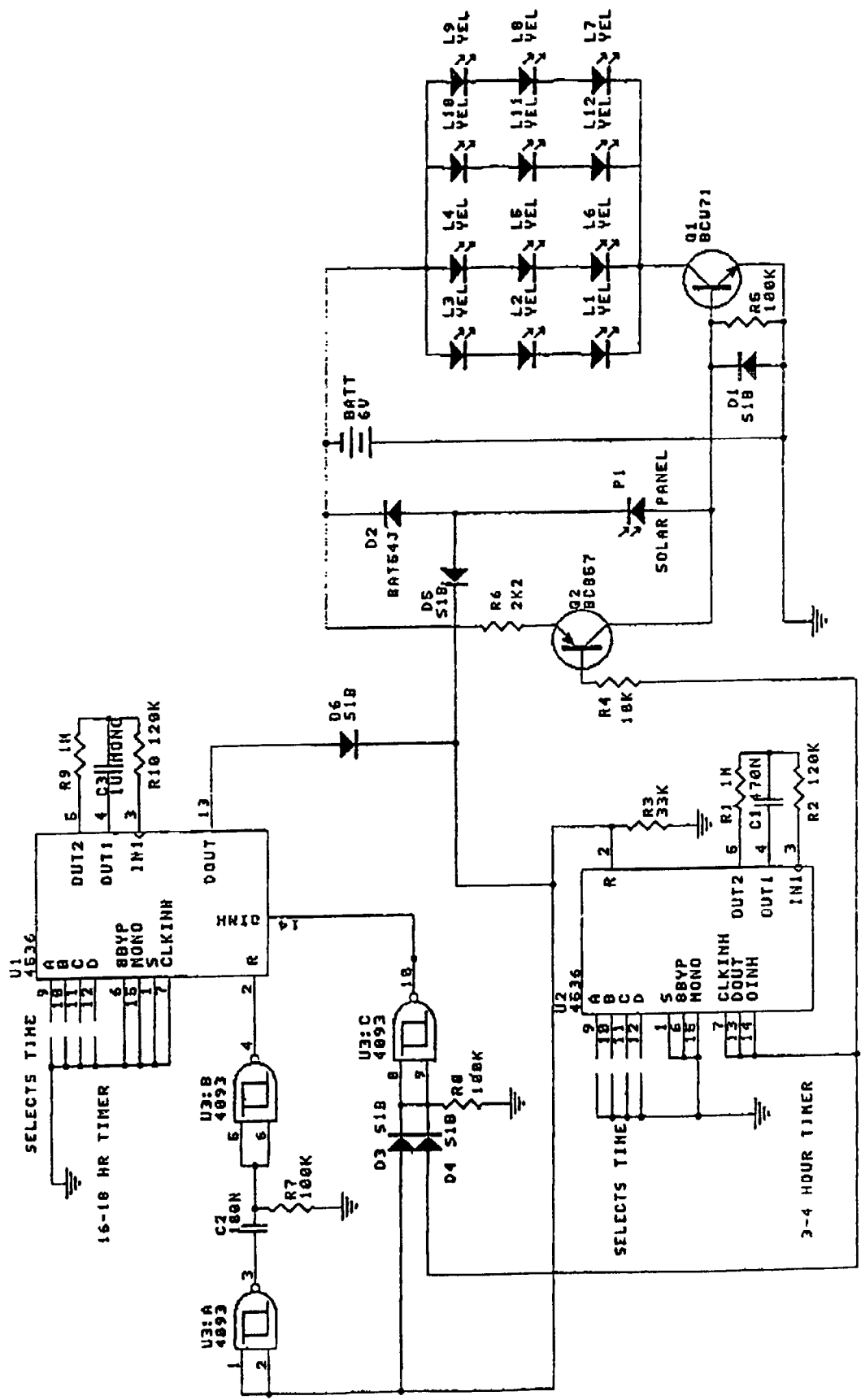
FIG. 7 is a circuit diagram of the lighting apparatus of FIG. 1.

A circuit diagram for the control system of the lighting unit 2 is illustrated in FIG. 7. Specifically, at sunrise, daylight impinges on solar panel P1 causing a voltage to the generated by the photovoltaic cells of the solar panel which is applied to the battery (6V) via diode D2. The voltage also appears at pin 2 of U2 (timer 1) via diode D5 which resets U2. The voltage also appears at pins 1 and 2 of U3, generating a pulse via capacitor C2, resistor R7 and U3:B on pin 2 of U1 which resets this timer. Diode D3 applies the P1 voltage to pins 8 and 9 of U3:C whose output then goes low removing the inhibit from U1 which starts counting immediately the reset pulse has occurred.

As the battery is charged via diode D1 which is in the negative lead of solar panel P1, the junction of diode D1 and P1 is more negative than the negative terminal of the battery. This negative voltage appears at the base of transistor Q1 and maintains the transistor in a switched off condition preventing the light emitting diodes L1 to L12 from emitting light Further control of the operation of the LED's is achieved by transistor Q2 which is switched on during the daylight.

When the voltage from solar panel P1 drops due to fading sunlight, the voltage at pin 2 of U2 (timer 2) decreases allowing U2, which has been on hold, to start counting. As this occurs, the voltage at pins 8 and 9 of U3:C also decreases resulting in a high signal on inhibit pin 14 of U1. This causes that timer to stop but hold its count.

After the predetermined period of 3 hours set by U2 has elapsed, data out pin 13 of U2 goes to a high state which stops U2 counting via pin 7 and pin 14 of U2. This high signal also turns transistor Q2 off causing transistor Q1 to be also turned off extinguishing the light emitting diodes L1 to L12, and causing a low state at pin 14 of U1. This results in U1 continuing counting until the expiry of the complete 18 hours at which time data out pin 13 of U1 goes to a high state. This resets both U1 and U2. U2 then restarts counting and light emitting diodes L1 to L12 are turned on until the predetermined 3 hour time period is completed or increasing daylight at or following sunrise causes U2 to be reset, at which time the option sequence of U1 and U2 recommences.

Figure 8:
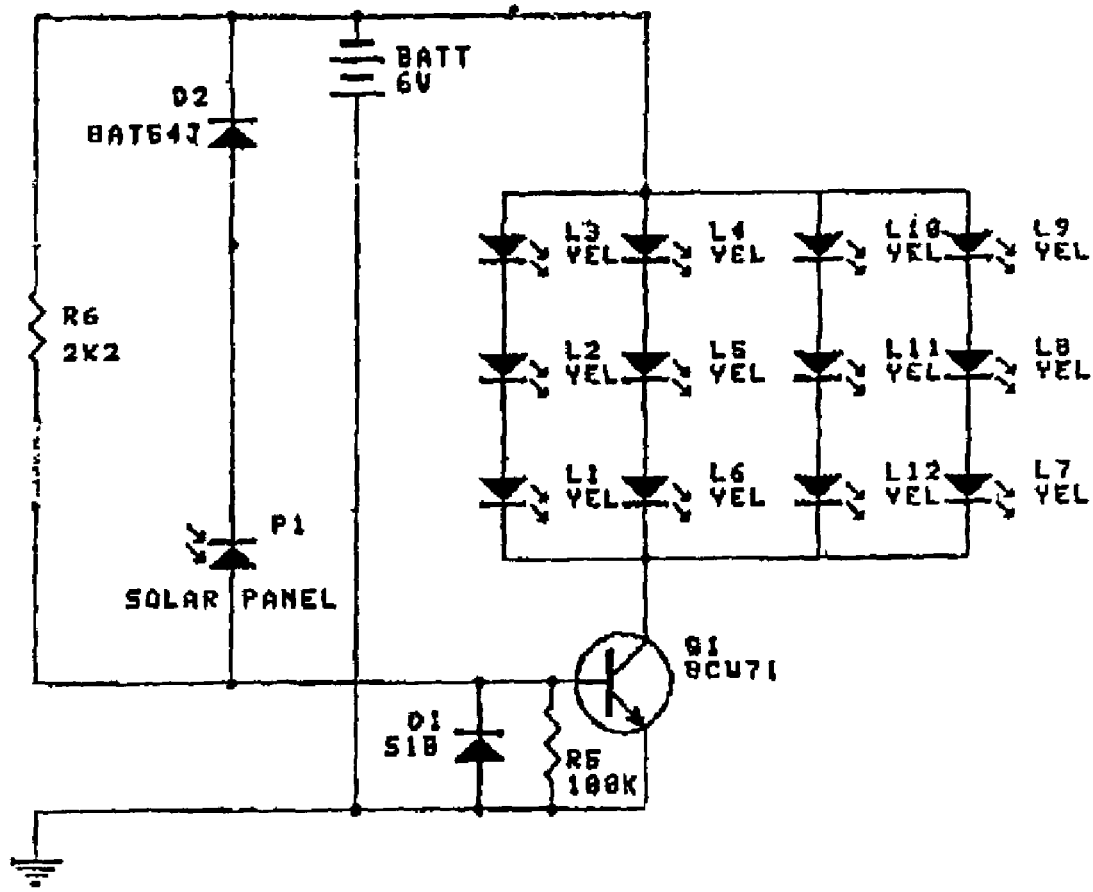
FIG. 8 is a circuit diagram of control system of another embodiment of the present invention.

Other embodiments of lighting unit 2 may be provided wherein light emitting diodes L1 to L12 are switched on as daylight fades and are switched off when sufficient daylight impinges on the solar panel the next morning. A circuit diagram for the control system of such an embodiment is illustrated in FIG. 8.

As will also be understood, an embodiment of a lighting unit 2 may be provided for being switched on remotely at ground level or by the pilot of an approaching aircraft. The transmitter modulo for generating the signal may, be portable or fitted to the aircraft, or for instance, a land vehicle. Once activated, the signal generated by the transmitter module is detected by a receiver on the or each of the lighting units 2 causing the LED's of the or each lighting unit to be switched on for a predetermined period and typically, for approximately 30 minutes.

Figure 9:
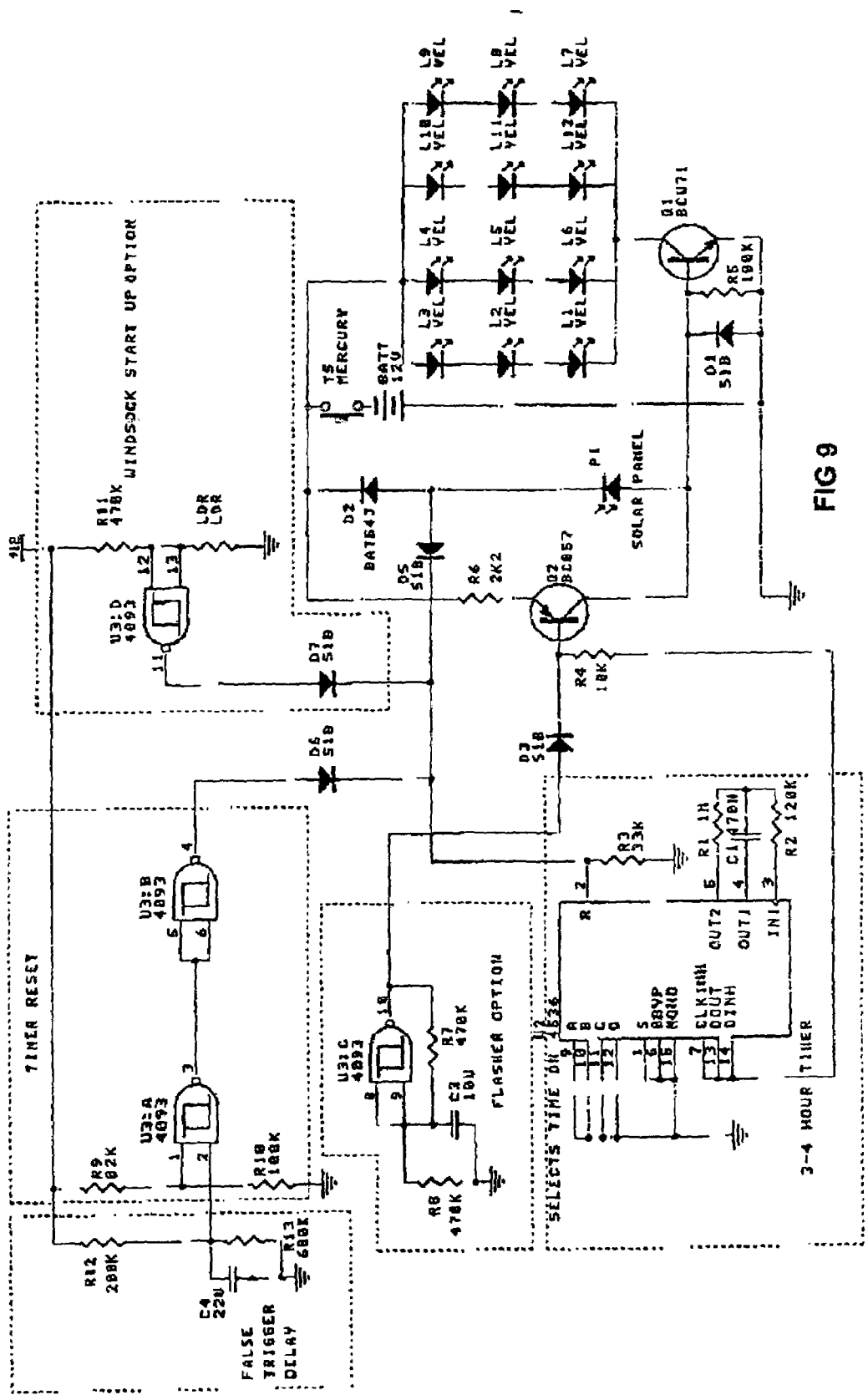
FIG. 9 is a circuit diagram of yet another embodiment of the present invention.

In another embodiment, light from a torch or from headlights from a vehicle may be used to activate the lighting unit and cause the light to be emitted be the LED's. Accordingly, this embodiment allows the lighting units to be operated by driving a vehicle past the lighting unit(s) with the vehicles headlights on or otherwise passing a torch over the lighting unit(s). In either case, the LED's can be quickly and readily operated in times of need. In order to avoid the light emitters being switched on by lightning or extraneous passing light sources, the control system will typically incorporate to a time delay circuit requiring light to be shone on the lighting unit for a continuous short period, typically 5 or 10 seconds, in order for the light emitters to be energised. A false trigger delay circuit for achieving this is illustrated in FIG. 9 which shows a circuit with a single timer for energising the lights for a single period of 3 hours commencing shortly prior to sunset, and FIG. 10 which shows a modified form of the circuit of FIG. 7.

Preferably, less light will be required for causing the light emitters to be turned on than for causing the light emitters to be turned off. This is advantageous as it facilitates operation of the light emitters utilising a hand held torch and reduces any potential for the lights being inadvertently switched off until sufficient daylight is available for adequate visibility of the airstrip. For instance, the light emitters may be turned on when light impinging on the solar panel causes a voltage of for instance 3 v to be generated, and be turned off when sufficient light is available for causing a higher voltage to be generated such as 6 v.

To reduce the potential for the light emitters to be turned off as a result of ambient light originating from the light of passing or approaching aircraft or the like, the control system of the lighting apparatus may be adapted for distinguishing between such transient ambient light and daylight. For instance, a third timer T3 may be provided which starts timing for a relatively short period if the pulse of ambient light results in a voltage being generated by the solar panel which is at or above the set threshold level for causing the LED's to be turned off. If at the end of the period counted by timer T3 the voltage is still being generated, the LED's are only then switched off. The short period may for instance be 10 minutes. Preferably, the period will be greater than about 2 minutes and usually greater than about 5 minutes.

In yet another embodiment, a version of a lighting unit of the invention incorporating infrared emitting diodes is provided for military use and particularly, for indicating the position of a landing site for military helicopters and aircraft. The infrared LED's are arranged in a T configuration on the top of the housing 4 of the unit and are only visible by eye through night vision goggles (NVG) worn by the pilot.

The lighting unit incorporates a VMF receiver and the infrared LED's are switched on by activation of the VW receiver by a VHF carrier wave signal transmitted from the approaching aircraft.

The lighting unit is further provided with a set of white light LED's 8 arranged in a staggered configuration as in the embodiment shown in FIG. 1 which are able to be switched on by another signal from the aircraft to the VHF receiver of the fighting unit in the event the night vision goggles of the pilot fail, which is not uncommon. The visible LED's may also be switched on by a ground crew using a hand held transmitter or by shining light on the lighting unit as described above. Each lighting unit is further provided with a mercury or other tilt switch for enabling the infra-red or visible light LED's to be switched off rapidly by simply turning the lighting unit upside down and thereby isolating the LED's from the power supply of the unit.

Alternatively, a further signal from the aircraft to the VHF receiver extinguishes the LED's once the aircraft has landed or there is otherwise a need to extinguish the LED's prior to landing. It is not necessary that a VHF signal be used and a UHF or other radio frequency receiver activatable by an appropriate signal from the aircraft may be utilised for causing the infra-red LED's to be switched on and off. Any conventionally known circuit suitable for switching the infrared and visible light LED's on and off via a radio wave signal may be utilised.

Typically, the control system of the lighting unit will be adapted for being reset after 1 hour of the infra-red LED's being activated.

In a particularly preferred embodiment, the infrared LED's are arranged immediately adjacent to the visible light LED's and in a staggered pattern for emitting light of an infrared wavelength at an increasing angle relative to a horizontal plane of reference. If desired, the infrared LED's may be arranged in an alternate pattern, with an infrared LED being followed by a visible light LED then another infared LED and so on.

A lighting unit of the type shown in FIG. 1 also finds use at temporary and shifting road works at construction sites, mining pits and tailings dump sites for guiding heavy vehicles and work vehicles along roads or paths under less than ideal conditions at night, usually in extreme dust conditions. In this version, however, the LED's are arranged for emitting the light over a lesser angle range compared to the embodiment in FIG. 1.

As with the lighting unit shown in FIG. 1, the control system of the unit is adapted for energising the LED's shortly before sunset. However, rather than switching off after a set period of two hours or so, the LED's are switched on for the entire night period and switched off at sunrise when sufficient light is available for safe navigation on the road. This embodiment incorporates a flashing circuit and the LED's flash on and off continuously during the period of operation of the LED's. By flashing on and off, power usage over this period is reduced significantly thereby conserving charge stored by the battery of the lighting unit.

In addition, rather than using 6 LED's in each set of diodes as in the lighting unit shown in FIG. 1, this version of the lighting unit has only three LED's arranged on opposite sides of the lighting unit respectively, one set emitting white light and the other emitting orange for indicating direction of road use. A further set of lights of another colour, usually red, is also provided on the housing of the lighting unit for being energised in an emergency. In this event, a radio signal from a dedicated transmitter is sent to a radio frequency receiver of the lighting unit causing the flashing LED's to be switched off and the emergency LED's to be activated providing a halt signal to traffic on the road A second signal from the transmitter to the radio frequency receiver of the lighting unit switches off the emergency LED's and energises the other sets of LED's which then continue flashing.

Other forms of emergency lighting apparatus suitable for indicating a site of an accident and which have at least one set of LED's arranged to emit light at an increasing angle along the set relative to a horizontal plane of reference as shown in FIG. 1, are also provided. These lighting units do not incorporate a solar panel but instead are recharged at a central location such as a police station or the like in a conventionally known manner prior to field use. The units incorporate a mercury tilt switch for isolating the LED's from the battery power source until operation of the LED's is required, which may be achieved by simply turning over the lighting unit to move the tilt switch and thereby close the circuit providing power to the LED's. Accordingly, the lighting units may be charged and then stored or transported to an accident or other site upside down for rapid use. This form of lighting unit is particularly useful for diverting traffic around a road accident rather than using road flares for this purpose which is common in some countries and which suffers from the significant drawback of providing a potential point of ignition for escaping fuel or volatile gaseous vapours.

A soft thick mat may also be provided on the underside of the base of the lighting unit to assist in maintaining the lighting unit in position on the road surface and disperse pressure over the base in the event the lighting apparatus is accidentally driven over. The mat may be made from any material deemed suitable as will be readily appreciated by the skilled addressee. After use, each lighting unit is collected, and turned upside down to turn off the LED's by virtue of the movement of the mercury tilt switch.

As the band of light emitted by the lighting unit 2 of FIG. 1 is rotated to a substantially upright position with distance from the lighting unit as discussed above, the lighting unit may be used to project a longitudinal band of light along a wind sock or weather vane commonly used to indicate wind direction For example, a light unit 2 may be adapted for being mounted to a suitable bracket located at the required distance above a wind sock. Specifically, the bracket will be mounted so as to be rotatable with the wind sock around a vertical axis as the wind direction changes, such that the band of light is maintained on the wind sock while the wind sock rotates about the axis.

Given the lighting unit will typically be mounted some distance above the ground in this application, activating the light emitters outside of their normal period(s) of operation by shining light from a hand held torch onto the solar panel of the unit from the ground as described above maybe difficult or not practical in all situations. As an alternative method of turning the light emitters on, a light dependent resistor (LDR) may be provided in an exposed position on the underside of the unit and activation of the light emitters achieved by shining torch light onto the LDR. This type of circuit is also exemplified in FIG. 9 and FIG. 10.

The phenomenon of the rotation of the band of light may also be used for evaluating the distance to a surface. That is, the distance required for the band of light to be rotated to the substantially upright condition can be readily determined to provide a reference distance. If the band of light shone onto the remote surface is upright, the operator then knows that the distance to the surface is the same or greater than the reference distance. If the band of light on the remote surface is only partially rotated to the upright condition, a measurement may be made of the angle of the band of light illuminated on the surface and a determination of the distance to the remote surface made. This may be achieved by comparing the measured angle with reference data indicating the distance for a particular measured angle.

In another embodiment, the phenomenon of rotation of the band of light may be used for indicating the direction of a path or walkway, or a border of a path or walkway such as a footpath, walking track or the like at a marina, camping ground, caravan block, suburban street, toilet block and the like. In this form the lighting unit is provided with a bracket and mounted on a pole adjacent the path or walkway such that in use, the light emitted by the LED's of the lighting unit is projected along or alongside the path or walkway in use.

Although the present invention has been described hereinbefore with reference to a number of preferred embodiments, the skilled addressee will understand that numerous variations and modifications are possible without departing from the scope of the invention.

The invention claimed is:

1. A lighting apparatus for being positioned adjacent an area or an object to indicate the location or orientation of the area or object, comprising:
   a housing, including a concave channel of a fixed and predetermined curvature;
   a set of light emitters mounted to the concave channel for emitting light to indicate the location or orientation of the area or object and being positioned side by side with respect to one another, the light from each light emitter of the set, according to the curvature of the concave channel on which it is mounted, overlapping with the light from each immediately adjacent light emitter of the set,
   wherein the light emitters are staggered about a plane of reference for emitting the light outwardly from the housing at an increasing angle along the set relative to the plane of reference, such that a band of light is formed that when viewed at a distance from the housing is rotated about an axis of rotation projecting from the plane relative to the set of light emitters, the light emitters being held in an essentially fixed orientation relative to one another and the housing at all times during operation of the lighting apparatus.

2. Lighting apparatus according to claim 1 wherein each successive light emitter of the set is arranged for emitting the light at an increased angle with respect to the plane of reference, respectively.

3. Lighting apparatus according to claim 1 wherein consecutive ones of the light emitters are oriented at an angle relative to one another for thereby emitting the light at the increasing angle relative to the plane of reference, and the angle between the consecutive ones of the light emitters is substantially constant along the set.

4. Lighting apparatus according to claim 1, wherein each said light emitter is adapted for emitting the light primarily in a beam over a predetermined angle of emission, respectively.

5. Lighting apparatus according to claim 4 wherein the predetermined angle of emission is substantially the same for each said light emitter.

6. Lighting apparatus according to claim 4 wherein the predetermined angle of emission is in a range of from about 6° to about 10°.

7. Lighting apparatus according to claim 1, wherein a concave surface is defined in the housing, and the light emitters are arranged along the surface and staggered around the concave of the surface such that the light emitters are thereby oriented for emitting the light at the increasing angle along the set relative to the plane of reference.

8. Lighting apparatus according to claim 1 comprising a further set of light emitters positioned side by side relative to one another for emitting light outwardly from the lighting apparatus, and wherein the further set of light emitters is staggered about a further plane of reference for emitting the light at an increasing angle along the set relative to the further plane of reference.

9. Lighting apparatus according to claim 8 wherein the further light emitters are provided for emitting light of a different colour compared to the set of light emitters.

10. Lighting apparatus according to claim 8 wherein the set of light emitters are mounted along one side of the housing, and the further light emitters are arranged along another side of the housing.

11. Lighting apparatus according to claim 1 further comprising one or more infrared emitting diodes for emitting an infrared signal for indicating the location of the area and being arranged for being activated remotely from the lighting apparatus.

12. Lighting apparatus according to claim 1 responsive to ambient light and adapted for operation of the light emitters for one or more periods during an operation cycle of the apparatus upon the apparatus sensing the ambient light decreasing below a threshold level.

13. Lighting apparatus according to claim 12 adapted for operation of the light emitters for a said period commencing at or prior to sunset and ending after sunset.

14. Lighting apparatus according to claim 12 adapted for operation of the light emitters for a first said period commencing at or prior to sunset and ending after sunset, and a second said period commencing prior to sunrise and ending at or after sunrise.

15. Lighting apparatus according to claim 1, wherein the lighting apparatus is adapted for detecting a decrease in ambient light below a threshold level and emitting the light from the light emitters on a first occasion for an initial period when the decrease in the ambient light below the threshold level is detected and on a second occasion for a subsequent period during an operation cycle of the lighting apparatus, and timing a predetermined period that is interrupted by the provision of the light for the initial period, and wherein the operation cycle is such that an interval between the first occasion and the second occasion on which the light is emitted is determined by time of the predetermined period remaining at the expiry of the initial period.

16. Lighting apparatus according to claim 15 further having a control system for controlling operation of the light emitters, comprising:
  a light sensitive element for detecting the ambient light;
  a timer for timing the predetermined period; and
  at least one further timer for determining the length of the initial period and the subsequent period.

17. Lighting apparatus according to claim 16 wherein the light sensitive element is adapted for detecting a desired level of ambient light for causing the commencement of the timing of the predetermined period of time, and wherein the desired level of ambient light is lower than the threshold level of ambient light below which the timing of the predetermined period of time is interrupted.

18. Lighting apparatus according to claim 17 wherein the control system is adapted for resetting the operation cycle upon the ambient light increasing to the desired level.

19. Lighting apparatus according to claim 15 adapted for resetting the operation cycle upon the ambient light increasing to a desired level.

20. Lighting apparatus according to claim 15, wherein the length of the initial period is the same or different to the length of the subsequent period.

21. Lighting apparatus according to claim 15 wherein the length of the initial period is the same as the length of the subsequent period.

22. Lighting apparatus according to claim 15 adapted for switching on the light emitters prior to sunset for the initial period and prior to sunrise for the subsequent period.

23. Lighting apparatus according to claim 22 wherein the initial period is for extending from prior to sunset until after sunset and the subsequent period is for extending from prior to sunrise until daylight.

24. Lighting apparatus according to claim 15 wherein the initial period and the subsequent period are each a set period, respectively.

25. Lighting apparatus according to claim 15 wherein the length of the initial period and the subsequent period is about 2 hours or greater, respectively.

26. Lighting apparatus according to claim 25 wherein the length of the initial period and the subsequent period is from between about 2 hours to about 5 hours, respectively.

27. Lighting apparatus according to claim 15 wherein the operation cycle is 24 hours in length.

28. Lighting apparatus according to claim 15 wherein the length of the predetermined period is 24 hours less the sum of the length of the initial period and the length of the subsequent period.

29. Lighting apparatus according to claim 15 further comprising one or more batteries for supplying power to the light emitters, and wherein the light sensitive element comprises photovoltaic cells for generating electricity for recharging the one or more batteries.

30. Lighting apparatus according to claim 15 further comprising an activation system for activating operation of the light emitters when desired outside of the initial period and the subsequent period.

31. Lighting apparatus according to claim 30, wherein the activation system is adapted for receiving the activation signal for a minimum period of time before activating the operation of the light emitters.

32. Lighting apparatus according to claim 15 further having a control system for controlling operation of the light emitters, comprising:
  a light sensitive element for detecting the ambient light;
  a first timer for timing the predetermined period; and
  a second timer for determining the length of the initial period and the subsequent period;
  wherein the first timer is arranged for commencing the timing of the predetermined period upon the light sensitive element detecting an increase in the ambient light to a desired level, and for interrupting the timing of the predetermined period upon the light sensitive element detecting the ambient light decreasing below the threshold level for thereby allowing the light to be provided by the light emitters for the initial period determined by the second timer, prior to the timing of the predetermined period by the first timer continuing at the expiry of the initial period.

33. Lighting apparatus according to claim 1 further comprising:
  one or more batteries for supplying power to the light emitters; and photovoltaic cells for generating electricity for recharging the one or more batteries.

34. Lighting apparatus according to claim 1 further comprising an activation system for activating operation of the light emitters when desired.

35. Lighting apparatus according to claim 1 wherein the activation system is responsive to an external activation signal.

36. Lighting apparatus according to claim 35 wherein the activation signal is light shone onto the lighting apparatus or a signal transmitted from a remote transmitter.

37. Lighting apparatus according to claim 36, wherein the activation signal is selected from the group consisting of an infra-red signal, a HF signal, a UHF signal, a VHF signal, a radio frequency (RF) signal, and an audio signal.

38. Lighting apparatus according to claim 1, wherein the light emitters comprise diodes.

39. Lighting apparatus according to claim 38, wherein the diodes each have an output rating of at least 2,500 mcd, respectively.

40. Lighting apparatus according to claim 38, wherein the diodes each have an output rating of at least about 6,000 mcd, respectively.

41. Lighting apparatus according to claim 38, wherein the diodes each have an output rating of at least about 7,500 mcd, respectively.

42. Lighting apparatus according to claim 1, wherein the lighting apparatus comprises a sealed lighting unit.

43. Lighting apparatus according to claim 1, wherein the lighting apparatus comprises an airstrip lighting unit for indicating the position and direction of an airstrip to an aircraft.

44. Lighting apparatus according to claim 1, wherein the lighting apparatus comprises a lighting unit for projecting the light onto an object for indicating the orientation of the object.

45. Lighting apparatus according to claim 1, wherein the lighting apparatus comprises a lighting unit for projecting the light onto an area for indicating a border of the area.

46. Lighting apparatus for providing light and suitable for being positioned adjacent an area or object to indicate the location or orientation of the area or object, wherein the apparatus is adapted for detecting a decrease in ambient light below a threshold level and providing the light on a first occasion for an initial period when the decrease in the ambient light below the threshold level is detected and on a second occasion for a subsequent period during an operation cycle of the lighting apparatus, and timing a predetermined period which is interrupted by the provision of the light for the initial period, and wherein the operation cycle is such that an interval between the first occasion and the second occasion on which the light is emitted is determined by time of the predetermined period remaining at the expiry of the initial period.

47. Lighting apparatus according to claim 46 further having a control system, comprising:
   a light sensitive element for detecting the ambient light;
   a timer for timing the predetermined period; and
   at least one further timer for determining the length of the initial period and the subsequent period.

48. Lighting apparatus according to claim 46 further having a control system, comprising:
   a light sensitive element for detecting the ambient light;
   a first timer for timing the predetermined period; and
   a second timer for determining the length of the initial period and the subsequent period;

wherein the first timer is arranged for commencing the timing of the predetermined period upon the light sensitive element detecting an increase in the ambient light to a desired level and interrupting the timing of the predetermined period upon the light sensitive element detecting the ambient light decreasing below the threshold level, for thereby providing the light for the initial period determined by the second timer prior to the timing of the predetermined period by the first timer continuing at the expiry of the initial period.

49. Lighting apparatus according to claim 48 wherein the desired level of ambient light is lower than the threshold level of ambient light below which the timing of the predetermined period of time is interrupted.

50. Lighting apparatus according to claim 46 wherein the light sensitive element is adapted for detecting a desired level of ambient light for causing the commencement of the timing of the predetermined period of time, and wherein the desired level of ambient light is lower than the threshold level of ambient light below which the timing of the predetermined period of time is interrupted.

51. Lighting apparatus according to claim 46 adapted for resetting the operation cycle upon the ambient light increasing to a desired level.

52. A lighting apparatus for being positioned adjacent an area or an object to indicate the location or orientation of the area or object, the lighting apparatus comprising:
   a housing;
   a set of light emitters for emitting light outwardly from the housing for one or more normal periods during an operation cycle of the lighting apparatus following ambient light decreasing below a threshold level, to thereby indicate the location or orientation of the area or object;
   a control system including a light sensitive element arranged to detect the ambient light for controlling the operation cycle;
   an activation system for activating operation of the light emitters during the operation cycle outside of the one or more normal periods while the ambient light is below the threshold level, in response to an external light signal; and
   a false trigger delay circuit for delaying operation of the light emitters to decrease likelihood of the activation system activating operation of the light emitters in response to a false external light signal;
   wherein the control system is adapted to reset the operation cycle upon the light sensitive element detecting the ambient light rising to, or above, a predetermined level.

53. Lighting apparatus according to claim 52 further comprising a timer for timing presence of the ambient light at, or above, the predetermined level for a predetermined period before the operation cycle is reset by the control system.

54. Lighting apparatus according to claim 52, wherein the light sensitive element detects the ambient light and the external light signal, and the threshold level of the ambient light at which the operation cycle is reset is higher than a level of the external light signal required for activating operation of the light emitters outside the one or more normal periods.

55. Lighting apparatus according to claim 52, wherein the light emitters are light emitting diodes.

56. A lighting apparatus for projecting light onto a remote surface for indicating distance from the apparatus to the surface, comprising:

a housing, including a concave channel of a fixed and predetermined curvature;

a set of light emitters mounted to the concave channel for emitting light onto the remote surface and being positioned side by side with respect to one another, the light from each light emitter of the set, according to the curvature of the concave channel on which it is mounted, overlapping with the light from each immediately adjacent light emitter of the set;

wherein the light emitters are staggered about a plane of reference for emitting the light outwardly from the housing at an increasing angle along the set relative to the plane of reference, such that the light from the light emitters when viewed at a distance from the housing is rotated about an axis of rotation projecting from the plane relative to the set of light emitters, the light emitters being held in an essentially fixed orientation relative to one another and the housing at all times during operation of the lighting apparatus.

57. A signalling apparatus for being positioned adjacent an area to indicate the location of the area, comprising:

a housing, including a concave channel of a fixed and predetermined curvature;

a set of infrared emitters mounted to the concave channel for emitting infrared light to indicate the location of the area and being positioned side by side with respect to one another, the infrared light from each infrared emitter of the set, according to the curvature of the concave channel on which it is mounted, overlapping with the infrared light from each immediately adjacent infrared emitter of the set;

wherein the infrared emitters are staggered about a plane of reference for emitting the infrared light outwardly from the housing at an increasing angle along the set relative to the plane of reference, such that a band of infrared light is formed that when viewed at a distance from the housing is rotated about an axis of rotation projecting from the plane relative to the set of infrared emitters, the infrared emitters being held in an essentially fixed orientation relative to one another and the housing at all times during operation of the signalling apparatus.

* * * * *